United States Patent
Johnsson et al.

(10) Patent No.: US 9,462,567 B2
(45) Date of Patent: Oct. 4, 2016

(54) NETWORK-LEVEL DEVICE PROXIMITY DETECTION

(71) Applicant: INTEL IP CORPORATION, Santa Clara, CA (US)

(72) Inventors: Kerstin Johnsson, Palo Alto, CA (US); Alexandre S. Stojanovski, Paris (FR); Muthaiah Venkatachalam, Beaverton, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 210 days.

(21) Appl. No.: 14/138,175

(22) Filed: Dec. 23, 2013

(65) Prior Publication Data

US 2014/0248901 A1    Sep. 4, 2014

Related U.S. Application Data

(60) Provisional application No. 61/771,698, filed on Mar. 1, 2013, provisional application No. 61/809,157, filed on Apr. 5, 2013.

(51) Int. Cl.
| | |
|---|---|
| *H04W 24/00* | (2009.01) |
| *H04W 64/00* | (2009.01) |

(Continued)

(52) U.S. Cl.
CPC ............. *H04W 64/00* (2013.01); *H04W 8/005* (2013.01); *H04W 76/023* (2013.01)

(58) Field of Classification Search
CPC ........ G01S 19/06; G01S 19/07; G01S 19/09; G01S 19/11; H04W 12/06; H04W 12/08; H04W 64/00; H04W 84/18; H04W 8/005; H04W 76/023; G06Q 30/02; H04H 60/90; H04L 2209/805; H04L 63/0414; H04L 63/0846; H04L 67/18; H04L 9/0637; H04L 9/28; H04L 9/3228
USPC ......... 455/436; 370/254, 384, 352; 379/230, 379/220.01, 224
See application file for complete search history.

(56) References Cited

U.S. PATENT DOCUMENTS

| | | | | |
|---|---|---|---|---|
| 2005/0188062 | A1* | 8/2005 | Li | .......................... H04W 8/005 709/220 |
| 2006/0046709 | A1* | 3/2006 | Krumm | .............. H04N 21/4126 455/422.1 |
| 2009/0327395 | A1* | 12/2009 | Park | ...................... H04W 8/005 709/202 |

(Continued)

FOREIGN PATENT DOCUMENTS

WO    2014/134406 A1    9/2014

OTHER PUBLICATIONS

International Search Report and Written Opinion received for PCT Patent Application No. PCT/US2014/019290, mailed on Jun. 26, 2014, 12 pages.

(Continued)

*Primary Examiner* — Mahendra Patel
(74) *Attorney, Agent, or Firm* — Thorpe North & Western LLP

(57) ABSTRACT

A technology for network-level device proximity detection is disclosed. In an example, core network (CN) device can include computer circuitry configured to: Store user equipment (UE) information; calculate proximity between two UEs; and assist the two UEs with direct device discovery based on the calculated proximity. The core network device can include a proximity services (ProSe) server, a gateway mobile location center (GMLC), an evolved serving mobile location center (E-SMLC), or a mobility management entity (MME).

30 Claims, 9 Drawing Sheets

(51) Int. Cl.
*H04W 8/00* (2009.01)
*H04W 76/02* (2009.01)

(56) References Cited

U.S. PATENT DOCUMENTS

| | | | | |
|---|---|---|---|---|
| 2010/0009675 A1* | 1/2010 | Wijting | ............ | H04W 72/02 455/426.1 |
| 2010/0165882 A1 | 7/2010 | Palanki et al. | | |
| 2011/0191187 A1* | 8/2011 | Charbit | ............ | G06Q 30/0241 705/14.64 |
| 2011/0258313 A1* | 10/2011 | Mallik | ............ | H04W 8/005 709/224 |
| 2012/0011247 A1 | 1/2012 | Mallik et al. | | |
| 2012/0082091 A1 | 4/2012 | Siomina et al. | | |
| 2012/0258703 A1* | 10/2012 | Hakola | ............ | H04W 4/023 455/422.1 |
| 2014/0092885 A1* | 4/2014 | Venkatachalam | ... | H04W 76/023 370/338 |

OTHER PUBLICATIONS

3rd Generation Partnership Project; Technical Specification Group Services and System Aspects; Functional stage 2 description of Location Services (LCS) (Release 11), 3GPP TS 23171 V11.1.0 (Dec. 2012), 170 Pages.

* cited by examiner

US 9,462,567 B2

NETWORK-LEVEL DEVICE PROXIMITY DETECTION

RELATED APPLICATIONS

This application claims the benefit of and hereby incorporates by reference U.S. Provisional Patent Application Ser. No. 61/771,698, filed Mar. 1, 2013. This application claims the benefit of and hereby incorporates by reference U.S. Provisional Patent Application Ser. No. 61/809,157, filed Apr. 5, 2013.

BACKGROUND

Wireless mobile communication technology uses various standards and protocols to transmit data between a transmission station and a wireless device (e.g., mobile device). Some wireless communication technologies use orthogonal frequency-division multiplexing (OFDM) combined with a desired digital modulation scheme via a physical layer. Standards and protocols that use OFDM include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the transmission station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless mobile device, known as a user equipment (UE). In IEEE 802.16 WiMAX RANs, the transmission station can be referred to as a base station (BS). In IEEE 802.11 WiFi RANs, the transmission station can be referred to as a WiFi wireless access point (WAP). The RAN can provide connectivity between a core network (CN) (e.g., an evolved packet core (EPC)) and the wireless device. The core network can provide connectivity to the Internet.

Wireless mobile communication technology can also include device-to-device (D2D) communication where two wireless devices (e.g., UEs) can communicate directly with each other without a node. D2D wireless communication techniques may be used to perform peer-to-peer/point-to-point (P2P) communications among mobile devices and networks in various settings. D2D communications between mobile devices may be designed to complement the use of centralized communications from a node. For example, node communication can include centralized station-to-mobile communications from an eNodeB in a carrier network operating with a standard from a 3GPP Long Term Evolution/Long Term Evolution-Advanced (LTE/LTE-A) standards family, or from an access point (AP) in a Wi-Fi network operating with a standard from a IEEE 802.11 standards family.

D2D direct communications may be limited to devices located within the communication range of the wireless protocol or network configuration being used. However, a particular user may not be aware whether D2D communication-capable devices or known users associated with D2D communication-capable devices are within communication range, or whether such devices or users are currently or are prospectively in proximity to the particular user. Existing discovery techniques used to locate and seek out nearby D2D-capable devices generally involve the use of broadcasting and response schemes, which utilize detailed processing, responses, and data exchanges to discover devices.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
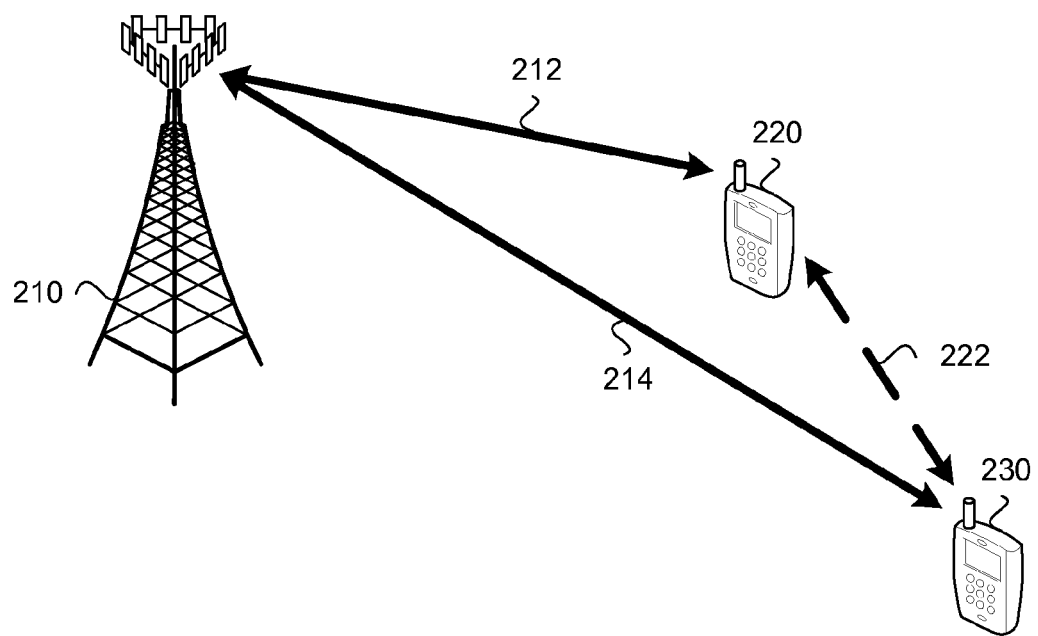
FIG. 1 illustrates a block diagram of a first D2D wireless device (e.g., UE), a second D2D wireless device, and a node (e.g., eNB) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Definitions

As used herein, the term "mobile device," "wireless device," or "wireless mobile device," refers to a computing device capable of wireless digital communication such as a smart phone, a tablet computing device, a laptop computer, a multimedia device such as an iPod Touch®, or other type computing device that provides text or voice communication.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Device-to-device (D2D) communication can be used after wireless devices (e.g., mobile devices) first "discover" each other. A D2D discovery process can be highly resource consuming for D2D communications. The D2D discovery process can include the mobile devices randomly sending requests for potential peers in hopes that other mobile devices are listening during that same period. The periodic polling of a D2D discovery process in attempts to find other devices that are listening can accelerate the drain of the battery of the mobile device and cause significant interference on the radio band.

In many D2D technologies, the UEs may continually advertise and/or search for advertisements from other UEs in order determine whether the UEs are in a D2D range. This continually advertisement process can be an inefficient use of radio and battery resources. The D2D discovery can be more efficient and consume less power by using the operator network to assist in the D2D discovery process, where the network can monitor UE locations and inform the UEs when a high probability exists that the UEs are in range with each other. When the operator network indicates the UEs are in proximity to each other, the UEs can engage in a direct discovery to confirm that the UEs are in D2D range. Using operator-network-assisted D2D discovery can improve performance and power usage for the D2D UEs.

FIG. 1 illustrates wireless devices (e.g., UEs 220 and 230) configured to communicate 214 and 212 with a node 210 (e.g., eNB) via the operator network, where the wireless devices are also configured to communicate 222 with each other via a D2D protocols. The device discovery process can include a device discovery message transmitted using the operator network, where the device discovery message instructs at least a pair of the wireless devices of the device discovery period allowing the two wireless devices to discover each other and communicate with each other via the D2D protocols. The device discovery process assisted by the operator network can improve the speed and power efficiency of the D2D device discovery. In addition, the operator-network-assisted D2D discovery can be used to perform network level device proximity detection.

To perform proximity detection, a core network device (e.g., ProSe server) can use UE locations as inputs and determine the UEs potential for successful D2D communications. UE locations can be obtained via existing location services (LCS) in the network.

To perform network level device discovery, in another example, the network can monitor the UE locations and calculate the UE proximity. The network's location services (LCS) can provide UE location estimation. A proximity services (ProSe) server can be a network entity (or core network device) that can assist the UEs with proximity detection. For example, the ProSe server can obtain UE location estimates via the network's LCS. LCS functionalities can expend a lot of signaling on the core network and radio and/or battery resources at the UE for the purposes of proximity detection. With modification to the LCS functionalities/capabilities and/or ProSe server, the efficiency of proximity detection can be improved.

Figure 2:
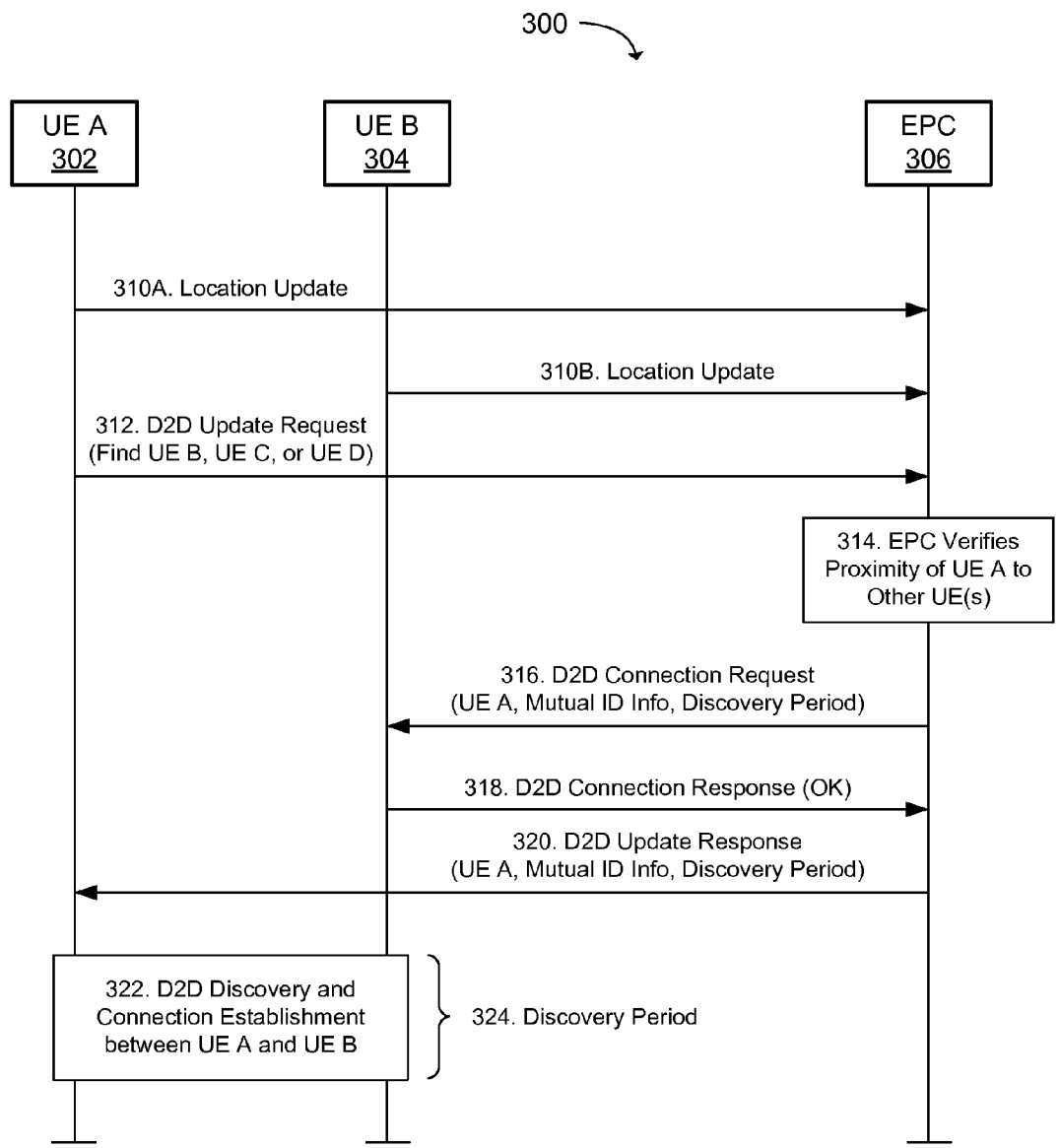
FIG. 2 illustrates a data sequence for establishing a D2D connection through a network operator in accordance with an example.

FIG. 2 provides an example illustration of a data sequence 300 for establishing a D2D connection between a pair of user devices (a UE A 302 and a UE B 304), in coordination with data operations of an EPC 306 managed by a network operator. The data sequence 300 is illustrated as providing for the establishment of a D2D connection between the UE A 302 and the UE B 304 when no pre-existing data flow or connection established through the EPC 306 between the pair exists.

First, the UE A 302 and the UE B 304 may perform intermittent location updates with the EPC 306 (operations 310A, 310B). The location updates enable the EPC 306 to be informed of the current location for each of the UE A 302 and the UE B 304. In some examples, information communicated in the location updates includes a position associated with a network coverage area, a position associated with a broader geographic area of the UE, or a specific determined geographical position. In other examples, the location updates include information related to the portion of the network in communication with the UE. Other techniques may be used to determine whether the UEs are not in proximity. For example, if the UE A 302 is associated with a public land mobile network (PLMN) that is not co-located with the PLMN that the UE B 304 is associated with, then the EPC 306 can conclude that the UEs are not in proximity for D2D communications.

Next, the EPC 306 can receive a notification that the UE A 302 wants to communicate with the UE(s) listed in the message. This notification may occur via a direct request from the UE A 302, transmitted within a D2D update request message (operation 312), or may occur via a high-level notification in the core network. This notification may indicate a one-time only event, or the notification may indicate to keep trying until some period of time lapses if a UE is not currently in proximity. The UE discovery request message may provide an indication to verify the location of one or more specific UEs, groups of UEs, or any D2D-capable UEs. For example, as illustrated in FIG. 2, the discovery request can be issued for multiple UEs (UE B, UE C, UE D). The UE discovery request message may indicate whether the UE just wants to know if a specific UE (or type of UE) is in proximity, or whether the UE wants to receive assistance from the carrier network in the direct discovery process (for example, to obtain identification and common discovery period information for establishing the direct D2D communication link).

The EPC 306 can check if the UE A 302 is in proximity of any of the UEs in the notification (operation 314). Information obtained from the UE location updates (operations 310A, 310B) may be used by the EPC 306 for this determination. In other examples, the network operator may base proximity on whether UEs are associated with the same eNodeB or in communication with particular eNodeBs or network subsystems.

In one scenario, the EPC 306 may check existing UE information databases to verify if UE A 302 has permission to connect with the requested UEs. In another scenario, a D2D request and response exchange may be conducted between the EPC 306 and any potential device (e.g., the UE B 304) indicated for proximity detection and/or D2D connection in the notification. This exchange may include transmission of a D2D request (operation 316) to the UE B 304, requesting permission to detect proximity and/or attempt establishment of a D2D connection. The confirmation or denial of this request may be indicated in a transmission of a D2D response (operation 318) returned to the EPC 306.

Having confirmed that the UE A 302 and the UE B 304 are in proximity, and that the connection request to the UE B 304 is confirmed, the EPC 306 can transmit a D2D update response (operation 320) to the discovering device (e.g., the UE A 302). The EPC 306 may also send the D2D update response to UE B 304 if D2D connectivity has been requested so that both UEs are informed to engage in discovery operations at a specific time, which device identifier to look for, and similar discovery information. Thus, the D2D update response may include mutual identifying information to enable the UE devices to find each other during a D2D discovery procedure. The D2D update response may also include information related to a mutual or common discovery period, to expedite the discovery process or otherwise coordinate discovery timing. In some examples, the EPC 306 may first wait for the UE B 304 to confirm the D2D request (operation 318) before proceeding with sending the discovery information to the UE A 302; in other examples a policy-based determination may be made whether to confirm the D2D request on behalf of the UE B 304.

Using information obtained from the EPC 306, the UE A 302 and the UE B 304 may perform operations to establish a D2D communications link (operation 322), including D2D discovery and connection establishment. The timing of the operations to establish the D2D communication link may be provided in connection with a discovery period 324. As suggested above, the EPC can coordinate the discovery timing and provide an indication of the discovery period 324 to the UE A 302 and the UE B 304; in other examples, the EPC 306 may first try to negotiate with each of the UEs to establish a mutual agreement for the discovery period 324. The discovery and connection establishment timing may be indicated by a start time, a start and finish time, or other signaling.

In connection with operation 322, the UEs can attempt to discover each other and establish the D2D communication link during the proposed discovery period 324 using the identification information provided by the EPC 306. A failure to establish the communication link may be communicated to the EPC 306 (and used to obtain additional information to retry establishment of the D2D communication link), or connect to another UE.

As illustrated in FIG. 2, a network assisted device discovery process can be used by which a UE (e.g., UE A 302) can request help from the network (e.g., EPC 306) to determine if and/or when another UE is in proximity. And when proximity is detected, the EPC can expedite direct discovery. In operation 314, the EPC can check the proximity of the UEs. The technology (e.g., core network devices, a ProSe servers, a gateway mobile location center (GMLC), an evolved serving mobile location center (E-SMLC), a mobility management entity (MME), a LCS client, location estimation client, a user equipment (UE), methods, computer circuitry, systems, mechanisms, processes, or procedures) described herein can provide efficient proximity detection. For example, the description can indicate some 3GPP core network entities involved in proximity detection and signaling between the core network entities.

To manage the proximity detection process, a proximity services (ProSe) server can be used to store UE information (such as discovery permissions, application and hardware identifiers, location history, and so forth), calculate and/or detect proximity, and assist UEs with direct device discovery (e.g., to confirm proximity).

Figure 3:
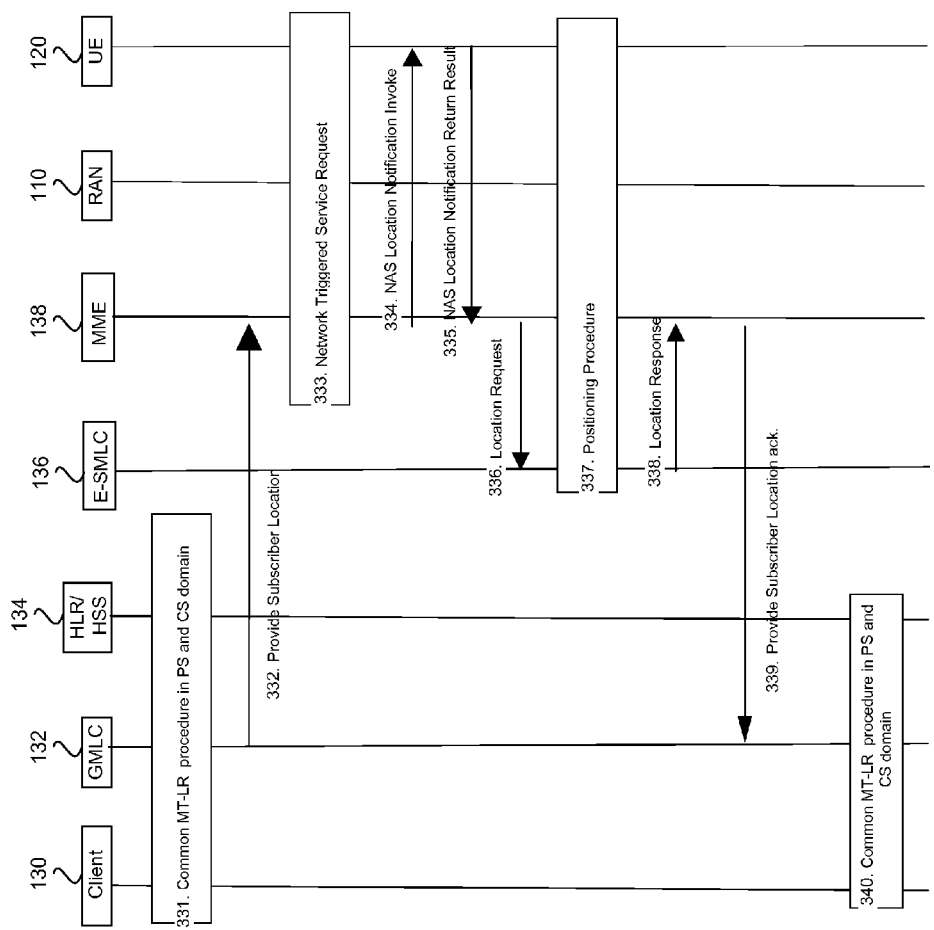
FIG. 3 illustrates a data sequence for a mobile terminating location request (MT-LR) in accordance with an example.

To calculate proximity, the ProSe server can first obtain the UEs' locations. FIG. 3 (also shown in FIG. 9.18 of 3GPP technical specification (TS) 23.271 V11.1.0 (2012-12) and described in section 9.1.15.1) depicts a possible location request procedure using a LCS client 130, a gateway mobile location center (GMLC) 132, home location register/home subscriber server (HLR/HSS) 134, an evolved serving mobile location center (E-SMLC) 136, a mobility management entity (MME) 138, a RAN 110, and a UE 120. The common mobile terminating location request (MT-LR) can be provided for the packet switched (PS) domain or circuit switched (CS) domain 331 and 340. In an example, the ProSe server can host the LCS client. These location request procedures can vary depending on the type of location estimation used. For instance, an LCS client can send a location request to the GMLC, and the GMLC can then forward the request (e.g., subscriber location 332) to the UE's MME. The MME can provide a network triggered service request 333, including sending a non-access stratum (NAS) location notification invoke 334 message to the UE, receiving a NAS location notification return result 335 message from the UE, and sending a location request 336 message to the E-SMLC. The E-SMLC can be a sub-server to assist with GMLC functions (i.e., a master server). The E-SMLC can provide a positioning procedure 337 and a location response 338 message to the MME. The MME can provide a subscriber location acknowledgement (ack) 339 message to the GMLC, which can be provided to the LCS client.

LCS client, as used herein, can be used interchangeably with a location estimation client. In an example, the LCS client (or location estimation client) can communicate from a core network (CN) device with a MME via the LCS, LCS server, or GMLC, for typical LCS communication, or the LCS client (or location estimation client) can communicate from a core network (CN) device with a MME directly (e.g., bypassing the LCS, LCS server, or GMLC).

At least two types of location requests can be used, which can include immediate location requests and deferred location requests. Each type of request can contain a set of attributes that can change the type of location information delivered. The technology described can expand the settings of certain attributes in order to improve the speed and/or resource efficiency of UE location estimation. For instance, the technology described can enable location deferred requests for the E-UTRAN, enable UE active/idle mode sensitivity, and add a cell identifier (ID) and tracking area to the list of location types.

Figure 4:
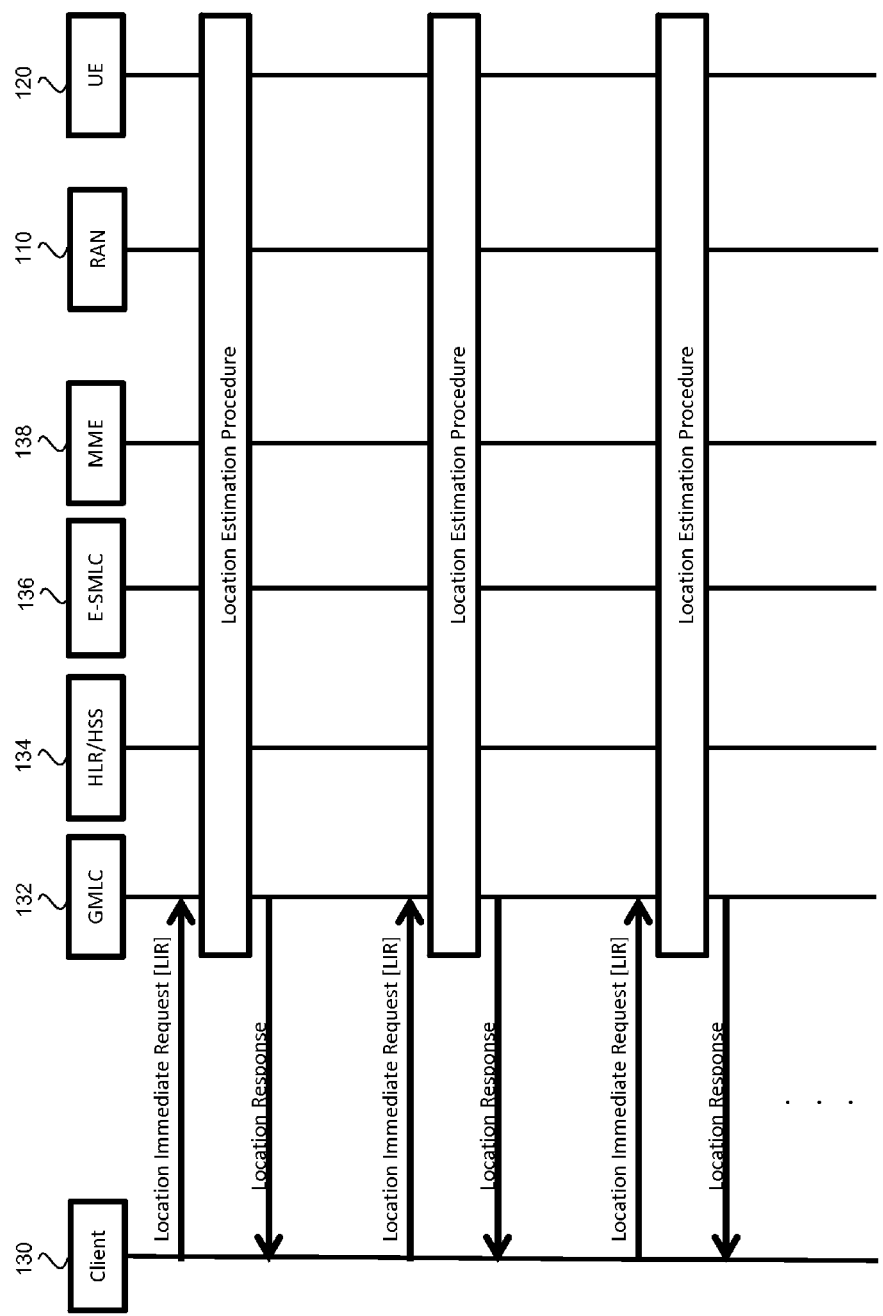
FIG. 4 illustrates a data sequence for periodic location requests without a deferred option (e.g. location immediate request (LIR)) in accordance with an example.

FIG. 4 illustrates a data sequence for location immediate request (LIR). For each LIR from a LCS client, the network can provide a location estimation procedure and a return a location response. The network can also send a location deferred request. The location deferred request (LDR) allows the client (e.g., LCS client) to request a location update periodically or based on a triggering event, such as a "change of area" event (e.g., a UE enters or leaves a specified area). Unlike immediate location updates using a LIR, a LDR can be used to report a location update based on a condition (or trigger) or expiration of a timer (e.g., periodic). For instance, if the ProSe server wants periodic location updates without LDR, the ProSe server can send a new LIR each time a location estimate is desired. With the LDR, the ProSe server can receive a location update if and/or when a UE comes within a specified distance (e.g., N meters) of a specific location, or the ProSe server can receive a location update periodically (e.g., every X number of seconds). The LDR can reduce and/or simplify location request signaling and processing. The GMLC 132 can be operable to accept LDRs for E-UTRAN deployments and process (act/respond) the LDRs accordingly. In an example of LDRs for periodic location updates, the GMLC can be operable to initiate periodic location updates with the MME, either by sending the MME a new location request every period or providing the MME with the requested periodicity. FIG. 4 illustrates periodically sending a location request using a LIR on a GMLC-MME interface. In an example, the LDR or the LIR can be a quality of service (QoS) attribute in the location update request.

Various options can be used to support trigger-based location updates which can have varying degrees of network signaling and changes to existing network entities. In a first example, a location update trigger mechanism can be placed at the MME. The MME can be provided a specified area and a UE to monitor and the MME can be instructed to send a location update to the GMLC (which location update can be passed onto the LCS client) if and/or when the UE enters the specified area. Because the MMEs can provide monitoring of the UE and communication closer to the UE (with fewer intermediary core network devices), providing the location update trigger mechanism at the MME can result in less network signaling. However, since the number of MMEs for a network can be greater than the number of the GMLCs or ProSe servers for the network, the number of updates to existing network entities (e.g., MMEs) used to implement this technology can be greater than with other options.

In a second example, the location update trigger mechanism can be placed at the GMLC. The LCS client can provide the GMLC with the specified area and UE to be monitored. The GMLC can initiate periodic location updates from the MME, and the periodicity can be intelligently adjusted (e.g., increase the frequency of the updates) as the UE approaches the specified area. The GMLC may only respond to the LCS client when the UE's location indicates that the UE has entered the specified area. Because the GMLC has periodic location update requests with the MME, providing the location update trigger mechanism at the GMLC can use more network signaling than the option with the trigger at the MME. However, since the number of GMLCs for the network may be smaller than the number of the MMEs for the network, the number of updates to existing network entities (e.g., GMLCs) can be smaller than the option with the trigger at the MME.

In a third example, the location update trigger mechanism and/or intelligence can be placed at the LCS client (e.g., the ProSe server). The ProSe server can request periodic updates from the GMLC, which can relay those requests on to the MME, and the ProSe server can intelligently adjust the periodicity as the UE approaches the specified area. Because the LCS client sends a new location update request to the GMLC whenever the LCS client wants to change the periodicity (and the GMLC may forward the change in periodicity to the MME, unless the GMLC sends an LIR periodically to the MME), providing the location update trigger mechanism at the LCS client can use more network signaling than an option with the trigger at the MME or the GMLC. However, since the ProSe server can be added to the network and/or the number of ProSe servers may be smaller than the number of the MMEs or GLMCs for the network, the number of updates to existing network entities (e.g., ProSe server may not be an existing network entity) can be smaller than the option with the trigger at the MME or the GMLC, or no changes to existing network entities may be needed (with an added ProSe server).

LIRs and LDRs can allow for UE active/idle mode sensitivity. With this capability, the MME waits until the UE comes out of idle (or sleep) mode and into active mode before requesting a location update from the UE. The UE active/idle mode sensitivity can be a quality of service (QoS) attribute in the location update request (in both the immediate (LIR) and deferred (LDR) request types) that can indicate whether the MME can defer location estimation until the UE comes out of idle mode.

Typically, when an LCS client requests a location update from the GMLC, the GMLC can pass the request onto the UE's MME, which can proceed with the location estimation process regardless of the UE's active/idle mode status. If the UE is in idle mode, the MME can bring the UE out of idle mode in order to perform location estimation, which may not be an efficient use of UE power (e.g., battery) resources. Given that many location update requests may not be time sensitive (particularly not when measured against idle period time scales), bringing a UE out of idle "early" simply to perform a location update can be a waste of radio and battery resources. The UE active/idle mode sensitivity QoS attribute in the location update request can signal to the MME to defer location estimation until the UE comes out of idle mode. In another example, when the LCS client requests active/idle mode sensitivity, the LCS client can also request the UE's latest location estimate (along with the age of the UE's location) when the UE is idle (so a current location estimate may not be provided). So if/when the MME defers the location estimation based on active/idle mode sensitivity, the LCS client can still receive a "stale" location estimate immediately, which can later be updated when the UE comes out of idle mode.

Another QoS attribute of a location update can include cell ID (CID) or a tracking area location, which can also be used as location estimates. Typically, the location estimates available to an LCS client are actual geographic coordinates. In many cases, this geographic coordinate location granularity may be more detailed than needed (e.g., "overkill") for the purpose of determining UE proximity. For example, if two UEs are on different continents, the LCS client (e.g., Prose server) can simply be informed of the UEs' cell IDs and/or registered tracking areas IDs in order to determine that they are not and with high probability may not be in proximity any time during the requested detection window. In these cases where the cells or tracking areas are a great distance apart (e.g., beyond a D2D range), channel and battery resources of the UE can be conserved and the UEs' specific geographic locations may not need to be determined. The LCS client may be able to indicate varying levels of location granularity in its location request to the GMLC, and the GMLC can request a UE's cell ID or tracking area from the MME. Each cell ID or tracking area can be associated with a geographic location and area (e.g., radius or other shape) around the geographic location.

Although, the illustrations use a MME, the mechanisms described in relation to the MME can also apply to a mobile switching center (MSC) and a serving general packet radio service (GPRS) support node (SGSN).

The LDR, UE active/idle mode sensitivity, and cell ID or a tracking area location granularity attributes can be used in conjunction during the proximity detection process to yield accurate results without wasting battery and radio resources. For example, the ProSe server can use these attributes and/or mechanisms when a UE A requests to be alerted when in proximity with UE B. Initially, the ProSe server can make immediate location requests for both UE A and UE B with cell ID or tracking area granularity. Based on the received location updates, the ProSe server can determine that the two UEs are roughly within a 4-5 kilometer (km) distance from each other. Then, the ProSe server can make new location requests using LDR periodic reporting including an indication that the MME may defer location estimation for UEs in idle mode. Based on the most recent periodic report, the ProSe Server can determine that the two UEs are within roughly 1 km distance from each other. Knowing that the UEs may soon enter within the range for direct radio discovery (e.g., 500 m), the ProSe server can make a new location request (e.g., LIR) indicating that the MME may not defer location estimation for UEs in idle mode (e.g., remove the UE active/idle mode sensitivity attribute). So, UEs in idle mode may be placed into active mode in order to respond to the location request.

Figure 5:
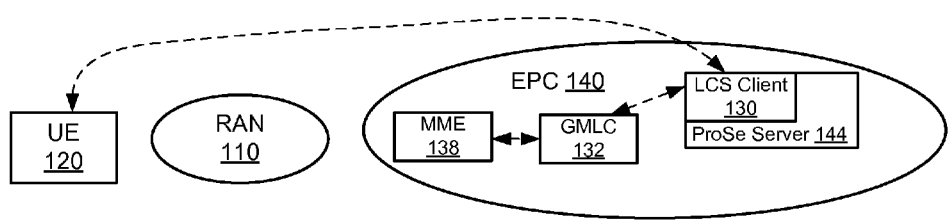
FIG. 5 illustrates an architecture for network-assisted device discovery with a ProSe server in communication with a mobility management entity (MME) via a gateway mobile location center (GMLC) in accordance with an example.

As described, the proximity services (ProSe) server, can assist UEs with proximity detection, including monitoring UE locations and calculating their proximity, which can be used to perform network level device discovery. In an example, the ProSe server can obtain detailed UE location estimates via the network's location services (LCS). But in some cases, the ProSe server can determine the UEs' cell IDs and/or tracking areas to rule out the possibility of proximity during a requested detection window. In these cases where the cell IDs and/or tracking areas are used, the detailed geographic coordinates of the UEs provided by the LCS may be unnecessary overhead. FIG. 5 illustrates an architecture for network-assisted device discovery with a ProSe server 144 in communication with the MME 138 via the GMLC 132 in the EPC 140.

Figure 6:
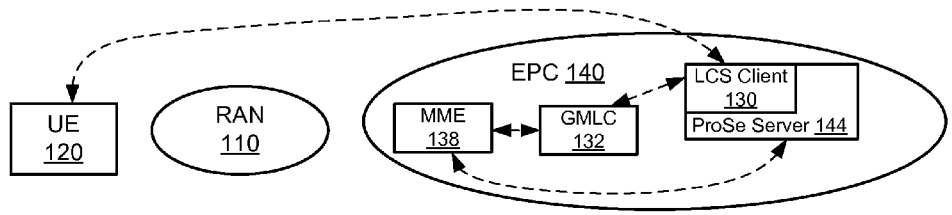
FIG. 6 illustrates an architecture for network-assisted device discovery with a ProSe server in communication with a mobility management entity (MME) and a gateway mobile location center (GMLC) in accordance with an example.

In another example, location estimation can be based on the ProSe server 144 communicating directly with the UE's MME 138 (e.g., bypassing the GMLC 132), as illustrated in FIG. 6. A direct interface between the ProSe server and MME can be useful in networks where the LCS is not enabled or not available.

As shown in FIG. 5, the ProSe server 144 (located in the EPC 140) can use location services (LCS), such as the GMLC, to determine UE locations (e.g., UEs' geographical coordinates) for the purpose of proximity detection of two or more UEs. The MME can also be used without the LCS or in conjunction with LCS to improve the speed and resource efficiency of UE location estimation, as illustrated in FIG. 6. In an example, the MME may be configured to communicate directly with the ProSe server (and the GMLC, HLR/HSS, or E-SMLC may not be used in the communication).

A location estimation process can vary depending on the type of location estimation requested, but typically each location estimation process begins with a location request from an LCS "client" 130 to the GMLC 132, as shown in FIG. 3. In an example, the ProSe server can operate as a LCS client. Once the GMLC receives a location request from an LCS client, the GMLC can forward the request to the relevant UE's MME, which can then coordinate the process of location estimation among the UE and nearby eNBs. The LCS client (e.g., the ProSe server) in communication with the GMLC can provide an accurate estimate of a UE's location.

However, in many cases, rough location of a given UE can suffice for D2D proximity detection, and LCS may use more overhead than is needed for proximity detection. For example, as previously illustrated, when the ProSe server first begins the process of proximity detection, the ProSe server can determine that proximity between UEs does not exist when the UEs are on different continents. Such UE proximity information can be provided by the MME without LCS. For instance, the ProSe server can communicate with the MME (with or without the GMLC) to acquire a UE cell ID and/or tracking area. Given that each cell and tracking area size may vary, the operator (or CN entity or device) can provide the ProSe server with information regarding cell and tracking area footprints associated with the cell ID or tracking area ID so proximity between cells or tracking areas can be determined. In an example, the cell or tracking area can be associated a center point (e.g., geographical coordinates) and radius (or other shape or markers). In another example, the cell or tracking area can be associated with boundaries (e.g., geographical coordinates).

Proximity detection based on a UE cell ID and/or tracking area can provide a rough location estimate. If and/or when a first ProSe server requests rough location information about a UE from a second ProSe server of a different operator, the second ProSe server can translate its UE's cell and/or tracking area into an actual footprint (e.g. latitude and longitude of the center of the cell and the cell radius [or other shape defined in LCS]) and can send the footprint to the first ProSe server.

In an example, UE A and UE B can belong to a same ProSe server and MME. The ProSe server can use both the MME and the LCS when UE A requests to be alerted for proximity with UE B. Once the ProSe server receives the request from UE A to determine the proximity of UE B, the ProSe server can send a request to the UEs' MME (or MMEs, if the UEs belong to different MMEs) for their current cell IDs and/or tracking areas. If the UE is active, the MME can send the UE's cell ID, and if the UE is idle, the MME can send the tracking area index (or tracking area ID). The ProSe server can translate the cell IDs and/or tracking area indexes into actual footprints (or a wide geographical coordinates) and can determine that the UEs are still too far apart to use accurate location updates or frequent location updates. In an example, the requested detection period can be several hours. The ProSe server can request the MME periodically send the UEs' cell IDs and/or tracking areas. Then, once the ProSe server detects that the UEs' cells and/or tracking areas are close (e.g., within the same cell or tracking area) or bordering each other (e.g., adjacent cells or tracking areas), the ProSe server can request accurate location estimates for both UEs from the LCS. The ProSe server can continue to request accurate location estimates from the LCS. The frequency of the requests from the ProSe server can increase as the UEs (e.g., UE A and UE B) move closer together until the ProSe server determines that the UEs are in proximity (322 of FIG. 2). In another example, the ProSe server can send a periodic request with a smaller periodicity to the MME as the UEs (e.g., UE A and UE B) move closer together until the ProSe server determines that the UEs are in proximity for D2D discovery and connection establishment (322 of FIG. 2). Other examples can also be used using the same principles where UE A and UE B can belong to different ProSe servers and/or a different MMEs.

In another example, MME-based location estimation functionality can also be housed in the GMLC (as part of the LCS). When the GMLC includes MME-based location estimation functionality, the GMLC can include the entity that requests the cell ID and/or tracking area of a given UE, and the GMLC can also store the information regarding cell ID and tracking area footprints. If and/or when the ProSe Server requests a "rough location" of a specific UE, the GMLC can send (or forward) this request to the MME, translate the received cell ID and/or tracking area into a footprint, and return that footprint to the ProSe server.

The ProSe server communicating directly with the MME can have an architecture similar to a network where LCS is not supported. In this architecture, the ProSe server can use the MME and the UE (e.g., global positioning system (GPS) information) for purposes of UE location estimation.

For instance, UE A and UE B can again belong to a same ProSe server and MME. UE A can request to be alerted for proximity with UE B. Once the ProSe server receives the request from UE A to determine the proximity of UE B, the ProSe server can send a request to the MME for the UEs' current cell IDs and/or tracking areas. The ProSe server (without the use of the GMLC) can translate the cell IDs and/or tracking area indexes into actual footprints and can determine that the UEs are still too far apart to use accurate location updates or frequent location updates. In an example, the requested detection period can be several hours. The ProSe server can request periodic cell ID and/or tracking area updates for the UEs from the MME. Once the ProSe server detects that the UEs' cell and/or tracking areas are close or bordering each other, the ProSe server can request an accurate location estimate from both UEs, and the UEs can provide their GPS information. The ProSe server can continue to request accurate location estimates from the UEs. The frequency of the requests from the ProSe server can increase as the UEs (e.g., UE A and UE B) move closer together until the ProSe server determines that the UEs are in proximity (322 of FIG. 2). In another example, the ProSe server can send a periodic request with a smaller periodicity to the MME as the UEs (e.g., UE A and UE B) move closer together until the ProSe server determines that the UEs are in proximity (322 of FIG. 2). Other examples can also be used using the same principles where UE A and UE B can belong to different ProSe servers and/or a different MMEs.

Figure 7:
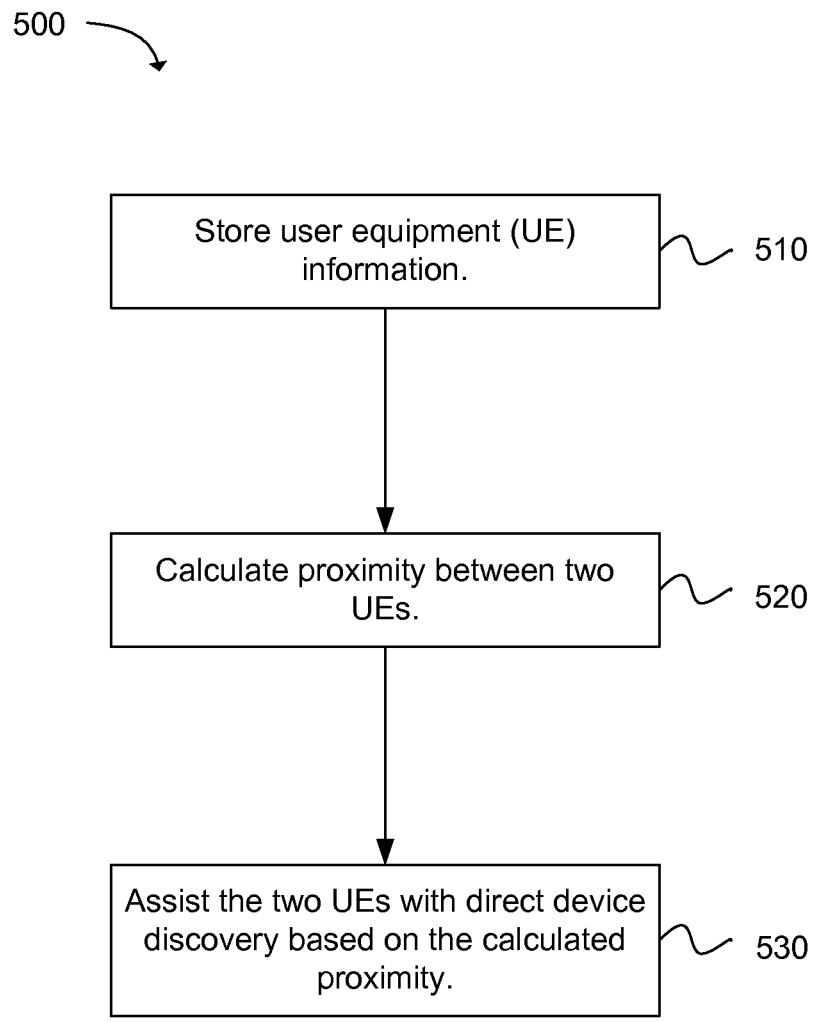
FIG. 7 depicts functionality of computer circuitry of core network (CN) device for network-level device proximity detection in accordance with an example.

Another example provides functionality 500 of computer circuitry of a core network (CN) device for network-level device proximity detection, as shown in the flow chart in FIG. 7. The functionality may be implemented as a method or the functionality may be executed as instructions on a machine, where the instructions are included on at least one computer readable medium or one non-transitory machine readable storage medium. The computer circuitry can be configured to store user equipment (UE) information, as in block 510. The computer circuitry can also be further configured to calculate proximity between two UEs, as in block 520. The computer circuitry can be further configured to assist the two UEs with direct device discovery based on the calculated proximity, as in block 530.

The core network device can include a proximity services (ProSe) server, a gateway mobile location center (GMLC), an evolved serving mobile location center (E-SMLC), or a mobility management entity (MME). The UE information can include discovery permissions, application identifiers, hardware identifiers, or a location history. In an example, the core network device can host a LoCation Services (LCS) client. The computer circuitry can be further configured to send a location deferred request (LDR) for periodic location updates or location updates based on a change of area event. The change of area event can include an event when a UE enters or exits a specified geographic area.

In another example, the computer circuitry can be further configured to receive a location deferred request (LDR) message from a LoCation Services (LCS) client; and send a last location estimate of the UE with a time stamp or age of the last location estimate to the LCS client directly or via a gateway mobile location center (GMLC) when the UE is in an idle mode and operating in an active-idle sensitivity mode.

In another configuration, the core network device can include a mobility management entity (MME). The computer circuitry can be further configured to: receive an active-idle mode sensitivity request to enable active-idle sensitivity mode for the UE; and wait to send the location request that includes the immediate request type to the UE until the UE is in an active mode. In another example, the computer circuitry can be further configured to: receive, from a LoCation Services (LCS) client, a location request to monitor the UE; and send a location update including the UE's rough location information to the LCS client when the UE is monitored by the MME. The UE's rough location information can include a cell identifier (ID) or a registered tracking area ID for the cell or tracking area in which the UE is located. The computer circuitry can be further configured to: communicate directly with a proximity services (ProSe) server; and send to the ProSe server a location and size for a cell or tracking area serviced by the MME. The location and size can include an area footprint, geographical coordinates, latitude and longitude, center coordinates, radius, or shape of the cell or tracking area represented by the cell ID or the registered tracking area ID. In another example, the computer circuitry can be further configured to: receive a location request from a LoCation Services (LCS) client for a UE and a specified geographic area; monitor the UE in the specified geographic area; and send a location update including the UE's fine location information or UE's rough location information to the LCS client based on a trigger event. The trigger event can include the UE's entry into or exit out of the specified geographic area, and the UE's fine location information includes geographic coordinates of the UE, and the UE's rough location information includes the UE's cell identifier (ID) or a registered tracking area ID.

In another configuration, the computer circuitry configured to monitor the UE can be further configured to: send a non-access stratum (NAS) location notification invoke message to the UE; and receive a NAS location notification return result message from the UE with the geographic coordinates of the UE.

In another configuration, the core network device can include a gateway mobile location center (GMLC). The computer circuitry can be further configured to send a periodic location deferred request (LDR) message to a mobility management entity (MME). The periodic LDR message can be sent at a specified periodicity or can include the specified periodicity for the MME to perform a location update. The computer circuitry can be further configured to: receive, from a LoCation Services (LCS) client, a location request to monitor a UE with regard to a specified geographic area; adjust the specified periodicity when the UE approaches the specified geographic area or travels away from the specified geographic area; receive a location update message from the MME regarding the UE in the specified geographic area; and send the location update message including the UE's fine location information or UE's rough location information to the LCS client based on a trigger event. The trigger event can include the UE's entry into or exit of the specified geographic area. The UE's fine location information can include geographic coordinates of the UE, and the UE's rough location information can include a cell identifier (ID) or a registered tracking area ID for the cell or tracking area in which the UE is located.

In another configuration, the core network device can include a proximity services (ProSe) server. The computer circuitry can be further configured to: communicate directly with a mobility management entity (MME) regarding a UE; send to the MME a location request to monitor the UE;

receive a location update including UE rough location information from the MME when the UE is being monitored by the MME; and determine a proximity between two UEs being monitored based on their rough location information. The UE rough location information includes a cell identifier (ID) or a registered tracking area ID for the cell or tracking area in which the UE is located. In another example, the computer circuitry can be further configured to: send a location deferred request (LDR) with a specified periodicity to a gateway mobile location center (GMLC); receive a LDR update message from the GMLC regarding the UE in the specified geographic area; and adjust the specified periodicity when the UE approaches the specified geographic area or travels away from the specified geographic area. The LDR can include a UE and a specified geographic area to monitor. The LDR can include the UE and a specified periodicity for an a mobility management entity (MME) to perform a location update. In another example, the computer circuitry can be further configured to: initiate device-to-device (D2D) discovery between the two UEs when the two UEs are within a D2D transmission range.

Figure 8:
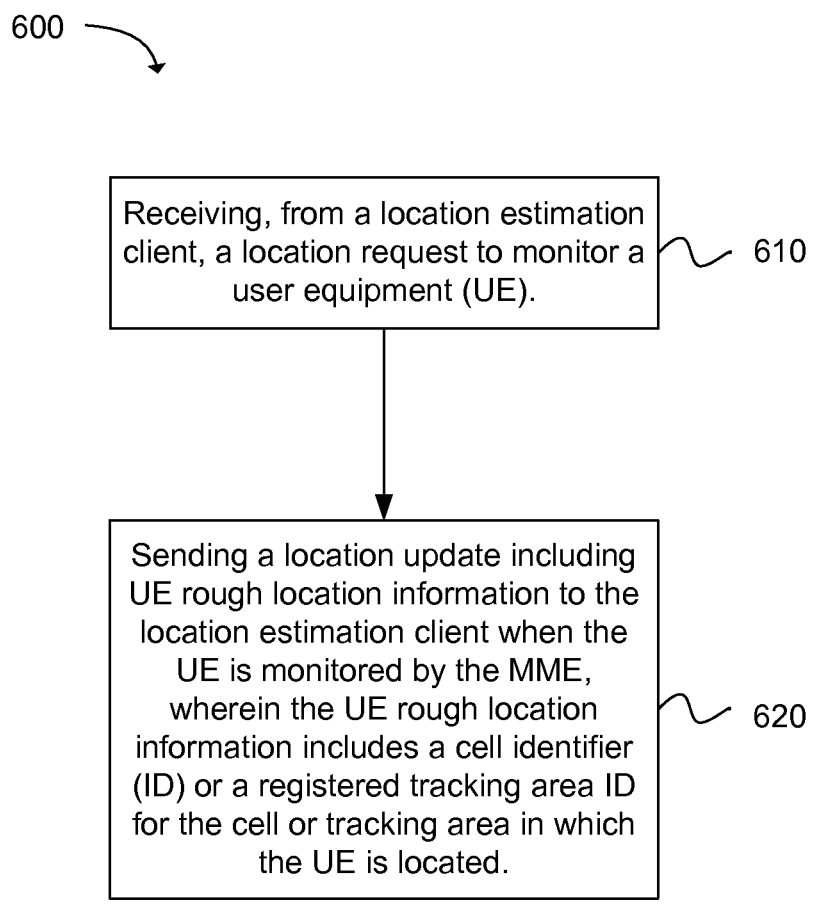
FIG. 8 depicts a flow chart of a method for network-level device proximity detection at a mobility management entity (MME) in accordance with an example.

Another example provides a method 600 for network-level device proximity detection at a mobility management entity (MME), as shown in the flow chart in FIG. 8. The method may be executed as instructions on a machine, computer circuitry, or a processor for the node (e.g., eNB), where the instructions are included on at least one computer readable medium or one non-transitory machine readable storage medium. The method includes the operation of receiving, from a location estimation client, a location request to monitor a user equipment (UE), as in block 610. The next operation of the method can be sending a location update including UE rough location information to the location estimation client when the UE is monitored by the MME, wherein the UE rough location information includes a cell identifier (ID) or a registered tracking area ID for the cell or tracking area in which the UE is located, as in block 620.

In an example, the operation of receiving the location request can further include receiving the location request from a LoCation Services (LCS) client via a gateway mobile location center (GMLC). The location estimation client can include the LCS client. Or, the operation of receiving the location request can further include receiving the location request directly from a core network (CN) node (e.g., a ProSe server). In a configuration, LCS client can refer to a location estimation client whether the location estimation client communicates with a CN node directly or via the LCS or GMLC.

In another example, the method can further include: monitoring the UE relative to a specified geographic area included in the location request; triggering an entry event when the UE enters the specified geographic area; and sending a location update for the UE to the location estimation client (e.g., directly or via the GMLC). The method can further include: sending a location estimation request to the UE after the entry event; receiving a location update including the UE's fine location information, wherein the UE fine location information includes geographic coordinates of the UE; and forwarding the location update for the UE to the location estimation client (e.g., directly or via the GMLC).

In another example, the operation of receiving the location request can further include receiving a location deferred request (LDR) or location immediate request (LIR) message with active/idle mode sensitivity. The method can further include sending a latest location estimate of the UE with a time stamp or age of the last location estimate to the location estimation client (e.g., directly or via the GMLC) when the UE is in an idle mode and operating in an active-idle sensitivity mode.

In another configuration, the operation of receiving the location request can further include: receiving a location deferred request (LDR) message with active/idle mode sensitivity. The LDR message can include a specified periodicity for the MME to perform a location update. The method can further include: periodically sending a location estimation request to the UE based on the specified periodicity and the UE's active/idle mode status, where the MME waits until the UE enters active mode (e.g., comes out of idle mode) to send the location estimation request; receiving a location estimate from the UE when the UE is in an active mode; and forwarding the location estimate to the location estimation client (e.g., directly via the GMLC). The location request can include a specified geographic area to monitor. The method can further include adjusting the specified periodicity when the UE approaches the specified geographic area or travels away from the specified geographic area.

In another example, the operation of receiving the location request can further include receiving a location deferred request (LDR) message. The method can further include: receiving an active-idle mode sensitivity request for the UE; determining when the UE is in an idle mode or an active mode; and delaying sending the location request to the UE until the UE is in active mode (e.g., out of idle mode).

In another configuration, the method can further include: communicating directly with a proximity services (ProSe) server; and sending to the ProSe server a location and size for a cell or tracking area monitored by the MME. The location and size includes an area footprint, geographical coordinates, latitude and longitude, center coordinates, radius, or shape of the cell or tracking area represented by the cell ID or the registered tracking area ID. A proximity services (ProSe) server includes the location estimation client.

Figure 9:
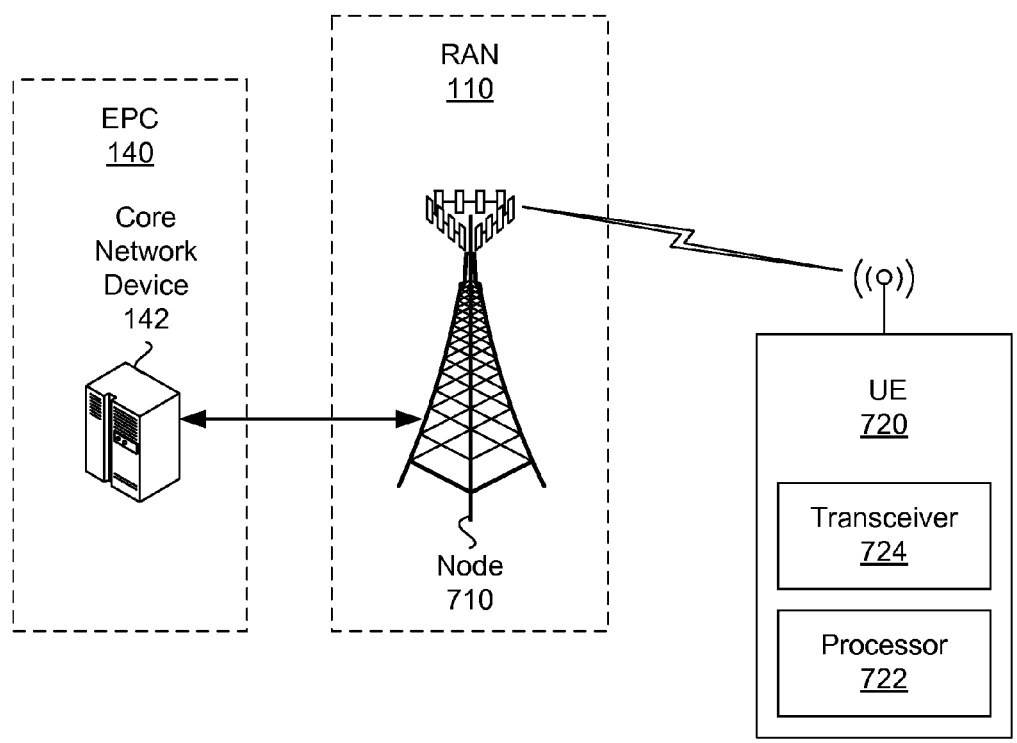
FIG. 9 illustrates a diagram of a core network (CN) device, a node (e.g., eNB), and a user equipment (UE) in accordance with an example.

FIG. 9 illustrates an example user equipment (UE) 720, a node 710 in a RAN 180, and a core network (CN) device 142 in a EPC 140 for network-level device proximity detection. For example, the CN device can be operable for network-level device proximity detection, as described in 500 of FIG. 7. In another configuration, the CN device can include a mobility management entity (MME), which can be configured for network-level device proximity detection, as described in 600 of FIG. 8. In an example, the UE can communicate with the CN device via the node. The node 710 can include a base station (BS), a Node B (NB), an evolved Node B (eNB), a baseband unit (BBU), a remote radio head (RRH), a remote radio equipment (RRE), a remote radio unit (RRU), a central processing module (CPM), or a wireless access point (WAP).

In another example, the CN device 142 can include a proximity services (ProSe) server, which can be configured for network-level device proximity detection. The ProSe server can include a transceiver and a processor. The transceiver can be configured to: send a location deferred request (LDR); and receive a location update including a location of a user equipment (UE). The processor can be configured to calculate a proximity between two UEs based on their location updates.

The LDR can request a specific periodicity for location updates or location updates based on a change of area event. The change of area event can include an event when the UE enters or exits a specified geographic area. Or, the LDR can include a specified periodicity for a mobility management entity (MME) to perform a location update. In another example, the transceiver can be further configured to: send an active-idle mode sensitivity request to enable active-idle sensitivity mode for the UE, where the MME waits until the UE comes out of idle mode to request the location update; receive the location update including the UE's rough location information from the MME when the UE is monitored by the MME, where the UE rough location information includes a cell identifier (ID) or a registered tracking area ID for the cell or tracking area in which the UE is located; communicate directly with the MME; or receive from the MME a location and size for a cell or tracking area serviced by the MME, where the location and size includes an area footprint, geographical coordinates, latitude and longitude, center coordinates, radius, or shape of the cell or tracking area represented by the cell ID or the registered tracking area ID. Or the processor can be further configured to adjust the specified periodicity when the UE approaches the specified geographic area or travels away from the specified geographic area.

In another configuration, the processor can be further configured to store user equipment (UE) information; and initiate device-to-device (D2D) direct discovery between the two UEs when the two UEs are within a D2D transmission range determined by the calculated proximity.

The UE 720 can include a processor 722 and a transceiver 724. In an example, the UE can be configured to assist in network-level device proximity detection. In another example, the UE can include a global positioning system (GPS) transceiver to process geographical coordinates of the UE (e.g., when LCS is not available for proximity detection).

Figure 10:
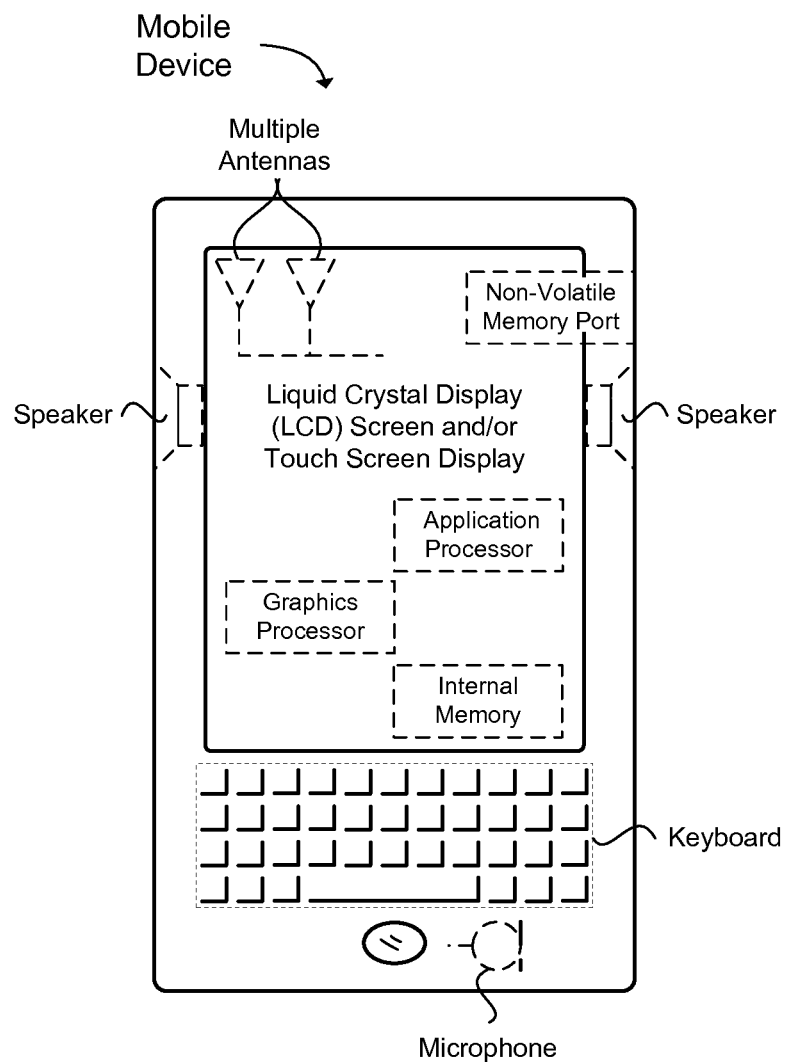
FIG. 10 illustrates a diagram of a mobile device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point (WAP). The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 10 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A core network (CN) device for network-assisted device proximity detection comprising a mobility management entity (MME), the core network device having computer circuitry configured to:
   store user equipment (UE) information that includes one or more of discovery permissions, application identifiers, hardware identifiers, or a location history;
   calculate a distance between two UEs;
   assist the two UEs with direct device discovery based on the calculated distance;
   receive a location deferred request (LDR) message from a LoCation Services (LCS) client; and
   send a last location estimate of the UE with a time stamp or age of the last location estimate to the LCS client directly or via a gateway mobile location center (GMLC) when the UE is in an idle mode and operating in an active-idle sensitivity mode.

2. The core network device of claim 1, wherein the network includes a proximity services (ProSe) server, a gateway mobile location center (GMLC), an evolved serving mobile location center (E-SMLC), or a mobility management entity (MME).

3. The core network device of claim 1, wherein the computer circuitry is further configured to host a LoCation Services (LCS) client.

4. The core network device of claim 3, wherein the computer circuitry is further configured to:
   send a location deferred request (LDR) periodically or based on a change of area event, wherein the change of area event includes an event when a UE enters or exits a specified geographic area.

5. The core network device of claim 1, wherein the core network includes a mobility management entity (MME), and the computer circuitry is further configured to:
   receive an active-idle mode sensitivity request, wherein the MME waits to request a location update from the UE until the UE is in an active mode; and
   send the location request that includes the immediate request type to the UE when the UE is in an active mode.

6. The core network device of claim 1, wherein the core network device includes a mobility management entity (MME), and the computer circuitry is further configured to:
   receive, from a LoCation Services (LCS) client, a location request to monitor the UE; and
   send a location update including UE rough location information to the LCS client when the UE is monitored by the MME, wherein the UE rough location information includes a cell identifier (ID) or a registered tracking area ID for the cell or tracking area in which the UE is located.

7. The core network device of claim 6, wherein the computer circuitry is further configured to:
   communicate directly with a proximity services (ProSe) server; and
   send to the ProSe server a location and size for a cell or tracking area serviced by the MME, wherein the location and size includes an area footprint, geographical coordinates, latitude and longitude, center coordinates, radius, or shape of the cell or tracking area represented by the cell ID or the registered tracking area ID.

8. A proximity services (ProSe) server for network-assisted device proximity detection, comprising:
   a transceiver to:
      send a location deferred request (LDR), wherein the LDR is sent periodically or based on a change of area event, wherein the change of area event includes an event when the UE enters or exits a specified geographic area, or the LDR includes a specified periodicity for a mobility management entity (MME) to perform a location update;
      receive a location update including a location of a user equipment (UE); and
      send an active-idle mode sensitivity request for the UE, wherein the MME waits until the UE is in active mode before requesting a location update; and
   a processor to:
      calculate a distance between two UEs based on the location update.

9. The ProSe server of claim 8, wherein:
the transceiver is further configured to:
receive the location update including UE rough location information from the MME when the UE is monitored by the MME, wherein the UE rough location information includes a cell identifier (ID) or a registered tracking area ID for the cell or tracking area in which the UE is located;
communicate directly with the MME; or
receive from the MME a location and size for a cell or tracking area serviced by the MME, wherein the location and size includes an area footprint, geographical coordinates, latitude and longitude, center coordinates, radius, or shape of the cell or tracking area represented by the cell ID or the registered tracking area ID; or
the processor is further configured to:
adjust the specified periodicity when the UE approaches the specified geographic area or travels away from the specified geographic area.

10. The ProSe server of claim 8, wherein:
the processor is further configured to:
store user equipment (UE) information; and
initiate device-to-device (D2D) direct discovery between the two
UEs when the two UEs are within a D2D transmission range determined by the calculated proximity.

11. A core network (CN) device for network-assisted device proximity detection comprising a mobility management entity (MME), wherein the core network device has computer circuitry configured to:
store user equipment (UE) information that includes one or more of discovery permissions, application identifiers, hardware identifiers, or a location history;
calculate a distance between two UEs;
assist the two UEs with direct device discovery based on the calculated proximity;
receive an active-idle mode sensitivity request, wherein the MME waits to request a location update from the UE until the UE is in an active mode;
send a location deferred request (LDR) periodically or based on a change of area event, wherein the change of area event includes an event when a UE enters or exits a specified geographic area; and
send the location deferred request that includes the immediate request type to the UE when the UE is in an active mode.

12. The core network device of claim 11, wherein the computer circuitry is configured to include a proximity services (ProSe) server, a gateway mobile location center (GMLC), an evolved serving mobile location center (E-SMLC), or the MME.

13. The core network device of claim 11, wherein the computer circuitry is configured to host a LoCation Services (LCS) client.

14. The core network device of claim 11, wherein the computer circuitry is configured to:
receive a location deferred request (LDR) message from a LoCation Services (LCS) client; and
send a last location estimate of the UE with a time stamp or age of the last location estimate to the LCS client directly or via a gateway mobile location center (GMLC) when the UE is in an idle mode and operating in an active-idle sensitivity mode.

15. The core network device of claim 11, wherein the core network device includes a mobility management entity (MME), and the computer circuitry is further configured to:
receive, from a LoCation Services (LCS) client, a location request to monitor the UE; and
send a location update including UE rough location information to the LCS client when the UE is monitored by the MME, wherein the UE rough location information includes a cell identifier (ID) or a registered tracking area ID for the cell or tracking area in which the UE is located.

16. The core network device of claim 15, wherein the computer circuitry is further configured to:
communicate directly with a proximity services (ProSe) server; and
send to the ProSe server a location and size for a cell or tracking area serviced by the MME, wherein the location and size includes an area footprint, geographical coordinates, latitude and longitude, center coordinates, radius, or shape of the cell or tracking area represented by the cell ID or the registered tracking area ID.

17. A proximity services (ProSe) server for network-assisted device proximity detection in communication with a mobility management entity (MME), the ProSe server comprising:
a transceiver to:
send a location deferred request (LDR); and
receive a location update including a location of a user equipment (UE);
receive a location deferred request (LDR) message from a LoCation Services (LCS) client; and
send a last location estimate of the UE with a time stamp or age of the last location estimate to the LCS client directly or via a gateway mobile location center (GMLC) when the UE is in an idle mode and operating in an active-idle sensitivity mode; and
a processor to:
calculate a distance between two UEs based on the location update.

18. The ProSe server of claim 17, wherein the LDR is sent periodically or based on a change of area event, wherein the change of area event includes an event when the UE enters or exits a specified geographic area, or the LDR includes a specified periodicity for the mobility management entity (MME) to perform a location update.

19. The ProSe server of claim 18, wherein:
the transceiver is further configured to:
send an active-idle mode sensitivity request for the UE, wherein the MME waits until the UE is in active mode before requesting a location update;
receive the location update including UE rough location information from the MME when the UE is monitored by the MME, wherein the UE rough location information includes a cell identifier (ID) or a registered tracking area ID for the cell or tracking area in which the UE is located;
communicate directly with the MME; or
receive from the MME a location and size for a cell or tracking area serviced by the MME, wherein the location and size includes an area footprint, geographical coordinates, latitude and longitude, center coordinates, radius, or shape of the cell or tracking area represented by the cell ID or the registered tracking area ID; or
the processor is further configured to:
adjust the specified periodicity when the UE approaches the specified geographic area or travels away from the specified geographic area.

20. The ProSe server of claim 17, wherein:
the processor is further configured to:
store user equipment (UE) information; and
initiate device-to-device (D2D) direct discovery between the two UEs when the two UEs are within a D2D transmission range determined by the calculated proximity.

21. A method for network assisted device proximity detection at a mobility management entity (MME), comprising:
receiving, from a location estimation client, a location request to monitor a user equipment (UE);
receiving a location deferred request (LDR) message;
sending a location update including UE rough location information to the location estimation client when the UE is monitored by the MME, wherein the UE rough location information includes a cell identifier (ID) or a registered tracking area ID for the cell or tracking area in which the UE is located; and
sending a latest location estimate of the UE with a time stamp or age of the last location estimate to the location estimation client when the UE is in an idle mode and operating in an active-idle sensitivity mode.

22. The method of claim 21, wherein receiving the location request further comprises:
receiving the location request from a LoCation Services (LCS) client via a gateway mobile location center (GMLC), wherein the location estimation client includes the LCS client; or
receiving the location request directly from a core network (CN) node.

23. The method of claim 21, further comprising:
monitoring the UE relative to a specified geographic area included in the location request; and
triggering an entry event when the UE enters the specified geographic area.

24. The method of claim 23, further comprising:
sending a location estimation request to the UE after the entry event;
receiving a location update including UE fine location information, wherein the UE fine location information includes geographic coordinates of the UE; and
forwarding the location update for the UE to the location estimation client.

25. The method of claim 21, wherein receiving the location request further comprises:
receiving a location deferred request (LDR) message, wherein the LDR message includes a specified periodicity for the MME to perform a location update; and
further comprising:
periodically sending a location estimation request to the UE based on the specified periodicity, but waiting for the UE to enter active mode before sending the request;
receiving a location estimate from the UE when the UE is in an active mode; and
forwarding the location estimate to the location estimation client.

26. The method of claim 25, wherein the location request includes a specified geographic area to monitor, and further comprising:
adjusting the specified periodicity when the UE approaches the specified geographic area or travels away from the specified geographic area.

27. The method of claim 21, wherein receiving the location request further comprises:
receiving an active-idle mode sensitivity request for the UE;
determining when the UE is in an idle mode or an active mode; and
delaying sending the location request to the UE until the UE is in the active mode.

28. The method of claim 21, further comprising:
communicating directly with a proximity services (ProSe) server; and
sending to the ProSe server a location and size for a cell or tracking area monitored by the MME, wherein the location and size includes an area footprint, geographical coordinates, latitude and longitude, center coordinates, radius, or shape of the cell or tracking area represented by the cell ID or the registered tracking area ID.

29. The method of claim 21, wherein a proximity services (ProSe) server includes the location estimation client.

30. The core network device of claim 1, wherein active-idle sensitivity mode is determined by a quality of service (QoS) attribute.

* * * * *